US009761886B2

(12) United States Patent
Kim et al.

(10) Patent No.: US 9,761,886 B2
(45) Date of Patent: Sep. 12, 2017

(54) CRYSTALLINE CARBON STRUCTURE, METHOD OF MANUFACTURING THE SAME, AND ENERGY STORAGE DEVICE HAVING THE SAME

(71) Applicant: Industry-Academia Cooperation Group of Sejong University, Seoul (KR)

(72) Inventors: Sun Jae Kim, Seoul (KR); Hee Gyoun Lee, Anyang-si (KR); Kang Seop Yun, Ansan-si (KR); Eul Noh, Goyang-si (KR); Hee June Jung, Seoul (KR); Jae Shin Shin, Siheung-si (KR)

(73) Assignee: Industry-Academia Cooperation Group of Sejong Univ, Seoul (KR)

( * ) Notice: Subject to any disclaimer, the term of this patent is extended or adjusted under 35 U.S.C. 154(b) by 117 days.

(21) Appl. No.: 14/618,974

(22) Filed: Feb. 10, 2015

(65) Prior Publication Data

US 2015/0228983 A1 Aug. 13, 2015

(30) Foreign Application Priority Data

Feb. 10, 2014 (KR) .......................... 10-2014-0015163
Dec. 31, 2014 (KR) .......................... 10-2014-0195500

(51) Int. Cl.
*H01M 6/00* (2006.01)
*H01M 4/96* (2006.01)
*C01B 31/02* (2006.01)
*H01M 12/08* (2006.01)
(Continued)

(52) U.S. Cl.
CPC .......... *H01M 4/96* (2013.01); *C01B 31/0293* (2013.01); *H01G 11/32* (2013.01); *H01M 4/625* (2013.01); *H01M 12/08* (2013.01)

(58) Field of Classification Search
CPC ...... H01M 4/8803; H01M 4/96; H01M 12/08; C01B 31/0293
See application file for complete search history.

(56) References Cited

U.S. PATENT DOCUMENTS

2009/0226704 A1* 9/2009 Kauppinen ............ B82Y 30/00
428/323
2011/0294661 A1 12/2011 Gadkaree et al.

FOREIGN PATENT DOCUMENTS

KR 10-2003-0093666 A 12/2003
KR 10-2005-0046358 A 5/2005
(Continued)

OTHER PUBLICATIONS

Li et al., "Solution Plasma Synthesis Process of Carbon Nano Particles in Organic Solutions", International Journal of Plasma Environmental Science & Technology, Mar. 2013, vol. 7, No. 1, pp. 31-36.
(Continued)

*Primary Examiner* — Raymond Alejandro
(74) *Attorney, Agent, or Firm* — Knobbe Martens Olson & Bear LLP (57) ABSTRACT

Provided are a carbon structure, a method of manufacturing the carbon structure, and an energy storage device having the carbon structure. According to the method of manufacturing the carbon structure, a reaction solution containing a catalyst and an organic solvent containing an aromatic compound is provided. Plasma is generated in the reaction solution, thereby forming a crystalline carbon structure.

20 Claims, 7 Drawing Sheets

(51) Int. Cl.
*H01M 4/62* (2006.01)
*H01G 11/32* (2013.01)

(56) References Cited

FOREIGN PATENT DOCUMENTS

KR   10-2013-0063718 A   6/2013
KR   10-2013-0086300 A   8/2013

OTHER PUBLICATIONS

Wesolowski et al., "Self-assembly of thin carbon micro-shells through pulsed laser irradiation of a ferrocene/benzene solution", Journal of Materials Science, 2013, vol. 48, pp. 6212-6217.

Plonska-Brzezinska et al., "Carbon nano-onions for supercapacitor electrodes: recent developments and applications", Journal of Materials Chemistry A, 2013, vol. 1, pp. 13703-13714.

Hyeon et al., "High-Performance Direct Methanol Fuel Cell Electrodes using Solid-Phase-Synthesized Carbon Nanocoils", Angewandte Chemie, 2003, vol. 115, pp. 4488-4492.

Kim et al., "Production of Carbon Black through Decomposition of Chlorobenzene", Theories and Applications of Chem. Eng., 2005, vol. 11, No. 2, pp. 2300-2303.

\* cited by examiner

PREPARATION EXAMPLE 1

FIG. 4

PREPARATION EXAMPLE 2

FIG. 5

PREPARATION EXAMPLE 3

FIG. 6

PREPARATION EXAMPLE 4

FIG. 7

PREPARATION EXAMPLE 5

FIG. 8

PREPARATION EXAMPLE 6

FIG. 9

PREPARATION EXAMPLE 7

FIG. 10

PREPARATION EXAMPLE 8

FIG. 11

PREPARATION EXAMPLE 9

FIG. 12

PREPARATION EXAMPLE 10

FIG. 13

PREPARATION EXAMPLE 11

FIG. 14

COMPARATIVE EXAMPLE

CRYSTALLINE CARBON STRUCTURE, METHOD OF MANUFACTURING THE SAME, AND ENERGY STORAGE DEVICE HAVING THE SAME

CROSS-REFERENCE TO RELATED APPLICATION

This application claims priority to and the benefit of Korean Patent Application No. 2014-0015163, filed on Feb. 10, 2014 and Korean Patent Application No. 2014-0195500, filed on Dec. 31, 2014, the disclosures of which are incorporated herein by reference in their entirety.

BACKGROUND

Field

The present disclosure relates to a carbon structure, a method of manufacturing the same and an electrochemical device having the same, and more particularly, to an electrochemical energy storage device.

Discussion of Related Art

A carbon nanomaterial has been receiving attention as a next generation material since it has a light weight, and exhibits a high mechanical property and excellent electric and thermal characteristics by a method of bonding carbon atoms. Accordingly, results of studies for carbon nanomaterial having various nanostructures are continuously being released.

As a method of synthesizing a carbon nanomaterial, arc discharging, laser deposition, plasma enhanced chemical vapor deposition, thermal chemical vapor deposition, or vapor phase growth may be used. To synthesize a carbon nanomaterial, three components including a catalyst, a high temperature and a hydrocarbon material are required, and generally, a carbon nanomaterial is synthesized by a high temperature thermal treatment of a hydrocarbon material in the presence of a metal catalyst.

For example, according to a conventional thermal chemical synthesis method for one of the carbon nanomaterials, for example, a carbon nanotube, a catalytic metal layer is formed on a substrate using physical vapor deposition by an evaporator or sputterer, or metal organic chemical vapor deposition, and the carbon nanotube is grown using the catalytic metal layer.

In Korean Patent Publication No. 2003-93666, a method of synthesizing a carbon nanotube by thermal chemical vapor deposition is disclosed. However, according to this method, time for producing carbon nanotubes increases because time for heating a reaction furnace from room temperature to a synthesis temperature after loading a substrate is considerably long, and it is impossible to further load catalytic metals after finishing catalytic metal loading.

Therefore, there is a demand for a synthesis method for preparing a large amount of carbon nanomaterials by a simpler method.

SUMMARY

The present invention is directed to various aspects of making crystalline carbon structures.

One aspect of the invention provides a method of preparing nano-size particles containing carbon crystalline structures, the method comprising: providing a reaction mixture comprising an organic solvent, a metallocene and a sulfur-containing compound, the organic solvent comprising at least one selected from the group consisting of benzene, biphenyl, naphthalene and anthracene, the metallocene comprising at least one selected from the group consisting of ferrocene, nickelocene, cobaltocene, and ruthenocene, the sulfur-containing compound comprising at least one selected from the group consisting of thiophene, dibenzothiophene, diphenyldisulfide, hydrogen sulfide, diallyl sulfide and allyl methyl sulfide; subjecting the reaction mixture to a plasma discharge until the reaction mixture darkens with formation of carbon crystalline structures therein; and collecting particles containing carbon crystalline structures formed in the reaction mixture, wherein the carbon crystalline structures comprise mesopores with a diameter of 2-50 nm when the sulfur-containing compound is added in the reaction mixture in an amount of 10 parts by weight or more with respect to 100 parts by weight of the organic solvent. In the foregoing method, the sulfur-containing compound is thiophene. In the foregoing method, the metallocene is added in an amount of 5 parts by weight or more. In the foregoing method, the metallocene is ferrocene. In the foregoing method, the organic solvent is benzene. In the foregoing method, the reaction mixture further comprises water. In the foregoing method, the collected particles are nano-size particles. In the foregoing method, the particles further comprises a at least one of a transition metal oxide and a sulfur oxide.

Technical problems are not limited to the technical problems described above, and other technical problems which are not cited herein would be clearly understood to those of ordinary skill in the art.

In one aspect of the present invention, a method of manufacturing a carbon structure is provided. A reaction solution containing a catalyst and an organic solvent including an aromatic compound is provided. A crystalline carbon structure is formed by generating plasma in the reaction solution.

The aromatic compound may include benzene, biphenyl, naphthalene, anthracene or a combination of at least two thereof.

The catalyst may include an organic metal compound, a sulfur-containing compound, or a combination thereof. The organic metal compound may include a metallocene. The metallocene may include ferrocene, nickelocene, cobaltocene, or ruthenocene. In the reaction solution, the metallocene may be included at 1 to 10 parts by weight with respect to 100 parts by weight of the solvent. The metallocene in the reaction solution may be included at 2 to 10 parts by weight with respect to 100 parts by weight of the solvent. The metallocene may be included at 5 to 10 parts by weight with respect to 100 parts by weight of the solvent in the reaction solution.

The sulfur-containing compound may include thiophene, dibenzothiophene, diphenyldisulfide, hydrogen sulfide, diallyl sulfide, allyl methyl sulfide, or a combination thereof. The sulfur-containing compound may be included at 1 to 10 parts by weight with respect to 100 parts by weight of the solvent in the reaction solution.

The reaction solution may further include distilled water. In the plasma generating operation, a temperature of the reaction solution may be maintained at a boiling point of the aromatic compound.

In another aspect of the present invention, a carbon structure is provided. The carbon structure has various linear crystalline groups disposed in different directions, and includes a pore therein. The carbon structure may be a nanoparticle. The pore may be a mesopore. A transition metal oxide, a sulfur oxide or a combination thereof, which is disposed on a surface of or in the carbon structure, may be further included.

In still another aspect of the present invention, an energy storage device is provided. The energy storage device has a first electrode including a carbon structure having various linear crystalline groups disposed in different directions and having a pore therein, a second electrode, and an electrolyte disposed between the first electrode and the second electrode. The carbon structure may be a nanoparticle. The pore may be a mesopore. A transition metal oxide, a sulfur oxide or a combination thereof, which is disposed on a surface or in the carbon structure, may be further included.

BRIEF DESCRIPTION OF THE DRAWINGS

The above and other objects, features, and advantages of the present invention will become more apparent to those of ordinary skill in the art by describing in detail embodiments thereof with reference to the adhered drawings, in which.

DETAILED DESCRIPTION OF EMBODIMENTS

Hereinafter, the embodiment of the present invention will be described in further detail with reference to the accompanying drawings. However, the present invention is not limited to the embodiments that will be described herein, and may be concreted in different types.

Method of Manufacturing Crystalline Carbon Structure

Figure 1:
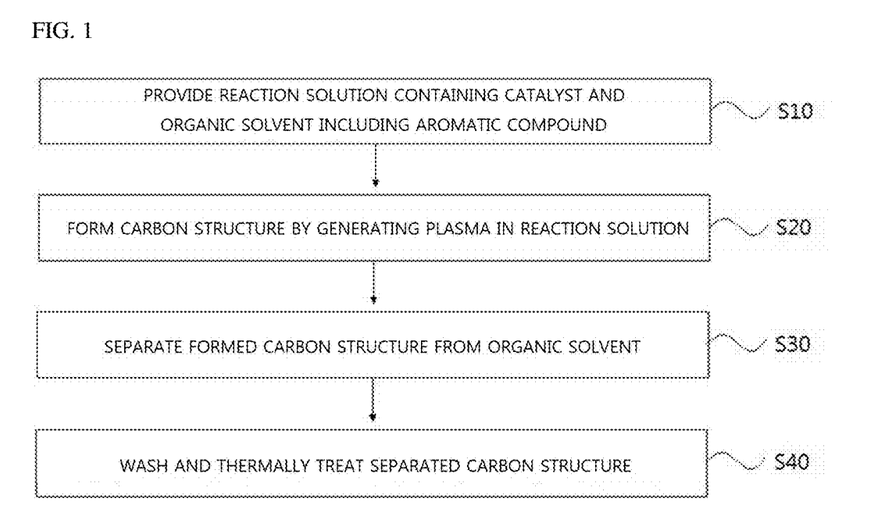
FIG. 1 is a flowchart illustrating a method of manufacturing a crystalline carbon structure according to an embodiment of the present invention.

FIG. 1 is a flowchart illustrating a method of manufacturing a crystalline carbon structure according to an embodiment of the present invention.

Referring to FIG. 1, a reaction solution containing a catalyst and an organic solvent including an aromatic compound is provided (S10).

The aromatic compound may be an aromatic compound having 6 to 12 carbon atoms, and may be a carbon precursor, that is, a base material for crystalline carbon. In one example, the aromatic compound may include non-substituted or substituted benzene, non-substituted or substituted biphenyl, non-substituted or substituted naphthalene, non-substituted or substituted anthracene, or a combination of at least two thereof. As a substituent, a hydroxyl group, a methyl group, or a nitro group may be used. As an example, the substituted benzene may be toluene, xylene or nitrobenzene.

The catalyst may include an organic metal compound, a sulfur-containing compound or a combination thereof. When the organic metal compound and the sulfur-containing compound are used together, the organic metal compound may be a catalyst, and the sulfur-containing compound may be a cocatalyst.

The organic metal compound may be at least one type of a metallocene. In one example, the metallocene may be ferrocene, nickelocene, cobaltocene, or ruthenocene, which includes a transition metal such as Fe, Ni, Co or Ru. The organic metal compound in the reaction solution may be included at 1 to 10 parts by weight, and particularly, 2 to 10 or 5 to 10 parts by weight with respect to 100 parts by weight of the solvent in consideration of crystallinity and economic feasibility.

The sulfur-containing compound may include thiophene, dibenzothiophene, diphenyldisulfide, hydrogen sulfide, diallyl sulfide, allyl methyl sulfide, or a combination thereof. The sulfur-containing compound may be included at 1 to 10 parts by weight, and particularly 2 to 10 or 5 to 10 parts by weight with respect to 100 parts by weight of the solvent in the reaction solution.

Meanwhile, distilled water may be further included in the reaction solution. The distilled water may be included at 100 to 1000 parts by weight, and particularly, 500 to 900 or 600 to 800 parts by weight with respect to 100 parts by weight of the organic solvent.

Subsequently, a carbon structure may be obtained by generating plasma in the reaction solution (S20). Here the resulting solution may be stirred to be mixed well.

Particularly immersing a plasma-generating electrode and a ground electrode into the reaction solution and applying a high voltage between the two electrodes may generate plasma. Here, the carbon structure may be produced by oxidation and/or reduction of the aromatic compound in the reaction solution. Conditions for generating the plasma may be applying a voltage of 660 to 8250 V at a frequency of 1 to 100 kHz, specifically 3 to 70 kHz, and a pulse width of 1 to 10 μs. As the frequency and voltage are increased, plasma intensity may be increased and a reaction rate may also be increased. Accordingly, an output of the carbon structure may be adjusted by adjusting a frequency, a voltage and a discharging time.

In addition, the reaction solution may not be cooled in the plasma generating operation. In other words, in the plasma generating operation, a temperature of the reaction solution may be maintained near the boiling point of the aromatic compound. In this case, it may increase catalytic activity, and thus crystallinity of the carbon structure may also be enhanced.

In the plasma generating operation, the organic metal compound may serve as a catalyst such that the carbon structure has a multilayer crystalline phase or a layered crystal structure of a graphite in which multilayer graphene layers are stacked, or a linear crystalline phase in which multilayer graphene layers are linearly extended. Particularly, when the organic metal compound is included in the reaction solution at 2 parts by weight or more with respect to 100 parts by weight of the solvent, such a multilayer crystalline phase or linear crystalline phase may predominantly appear in the carbon structure.

In addition, the sulfur-containing compound may serve as a cocatalyst helping the organic metal compound, and when such a sulfur-containing compound is included at 5 parts by weight or more, for example, 6 parts by weight or more, 7 parts by weight or more, 8 parts by weight or more, 9 parts by weight or more, or 10 parts by weight or more with respect to 100 parts by weight of the solvent, a mesopore may be formed in the carbon structure. Such a mesopore is a pore having a diameter of 2 to 50 nm, particularly, 2 to 20 nm, and the carbon structure having the mesopore may be applied in various electrochemical devices, particularly, an energy storage device.

In addition, when the distilled water is added to the reaction solution, the aromatic compound may be dispersed in the reaction solution. However, an oxygen functional group of the distilled water may react with a transition metal of the organic metal compound to generate a transition metal oxide, react with sulfur of the sulfur-containing compound to generate a sulfur oxide, or generate both of the oxides described above.

Finally, the carbon structure formed as described above may be separated from an organic solvent (S30). Such a separation may be performed using a filtering method.

Afterward, the separated carbon structure may be washed and thermal-treated (S40). The washing may be performed using an aqueous solution prepared by mixing water and a volatile solvent. However, the washing process is not limited thereto, and the washing may be omitted. The thermal treatment may be performed in an air atmosphere at 400 to 500° C. When the thermal treatment is performed at less than 400° C., an organic solvent remaining on a surface of the carbon structure may not be removed, and when the thermal treatment is performed at more than 500° C., the carbon may combust to carbon dioxide.

Crystalline Carbon Structure

The carbon structure formed as described above may be a nanoparticle having a size of several to several hundreds of nanometers. The nanoparticle may be a spherical particle having a mesopore. In addition, the carbon structure may have a crystalline phase. In this case, conductivity may be enhanced, and particularly, when the crystalline phase of the carbon structure is a linear crystalline phase or a multilayer crystalline phase such as graphite, the conductivity may be considerably enhanced. The carbon structure may have multiple linear crystalline groups in one particle, and such various linear crystalline groups may be arranged in different directions. Here, the linear crystalline group refers to a unit group in which a crystal surface, that is, a graphene layer is stacked in parallel to each other, and the direction of the linear crystalline group may refer to an extended direction of acrystalline surface in the linear crystalline group. Furthermore, multiple pores may be included in the carbon structure. Such a pore may be a mesopore, that is, a pore having a size of 2 to 50 nm, and particularly, a diameter of 2 to 20 nm. In addition, on a surface of or in the carbon structure, a transition metal oxide formed by oxidation of an organic metal compound, for example, an iron oxide, a nickel oxide, a cobalt oxide, a ruthenium oxide, a combination of at least two thereof, a sulfur oxide, or both of a transition metal oxide and a sulfur oxide may be disposed.

Energy Storage Device

Figure 2:
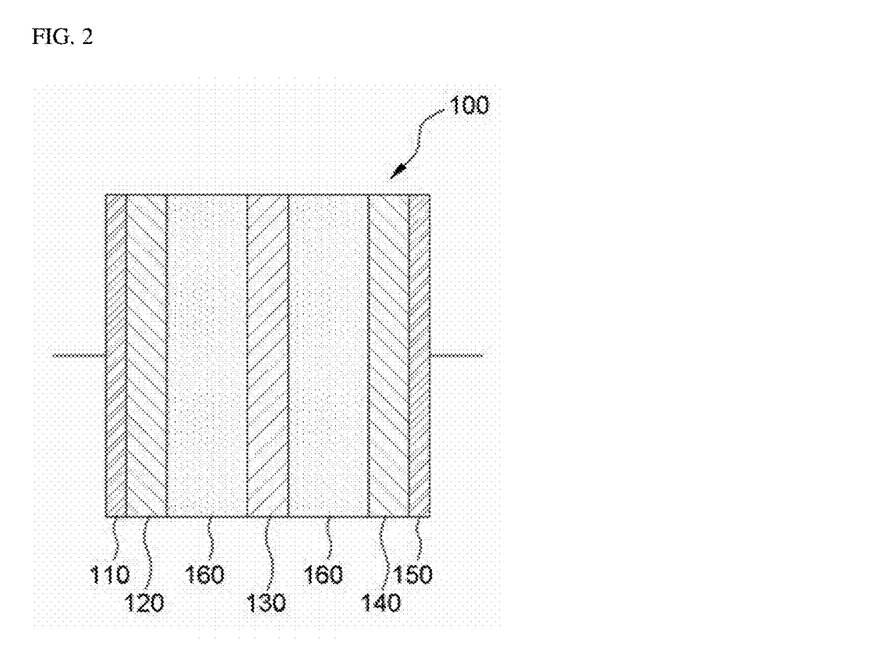
FIG. 2 is a schematic diagram of an energy storage device according to an embodiment of the present invention.
Figure 3:
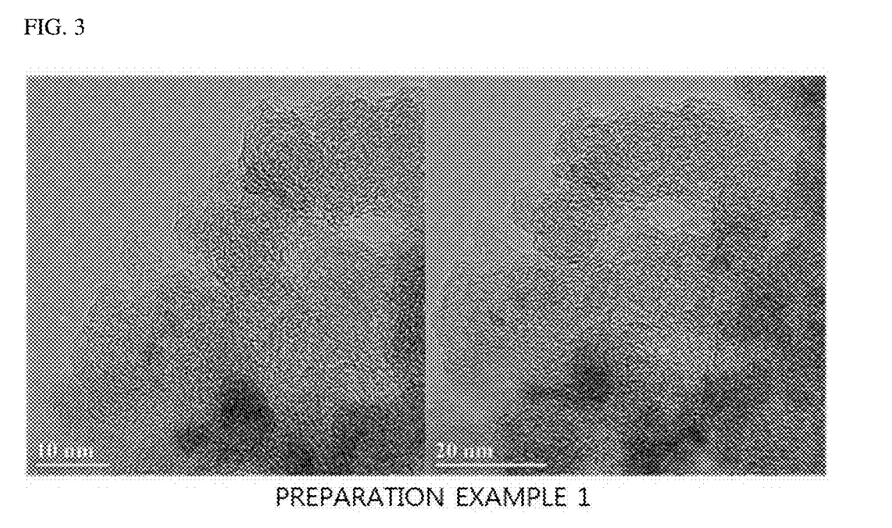
FIGS. 3 to 13 are transmission electron microscopy (TEM) images of carbon structures according to Preparation Examples 1 to 11.
Figure 4:
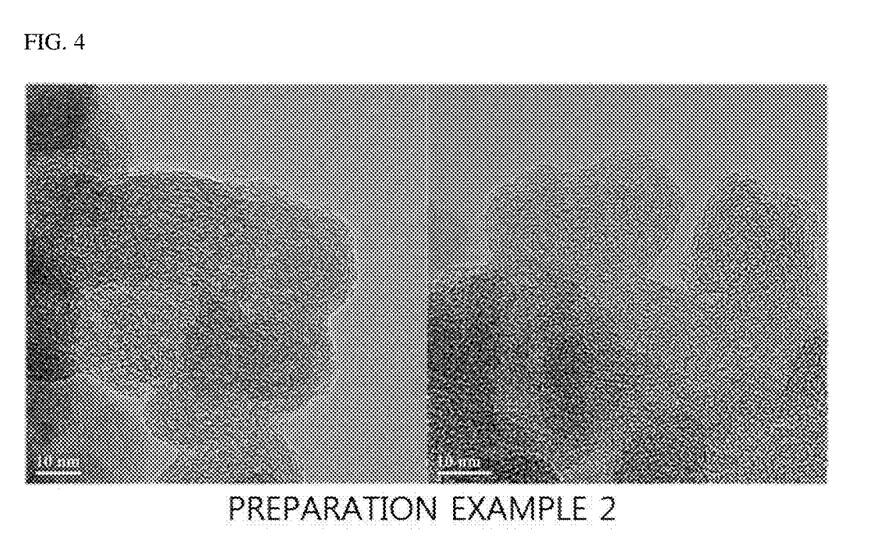
Figure 5:
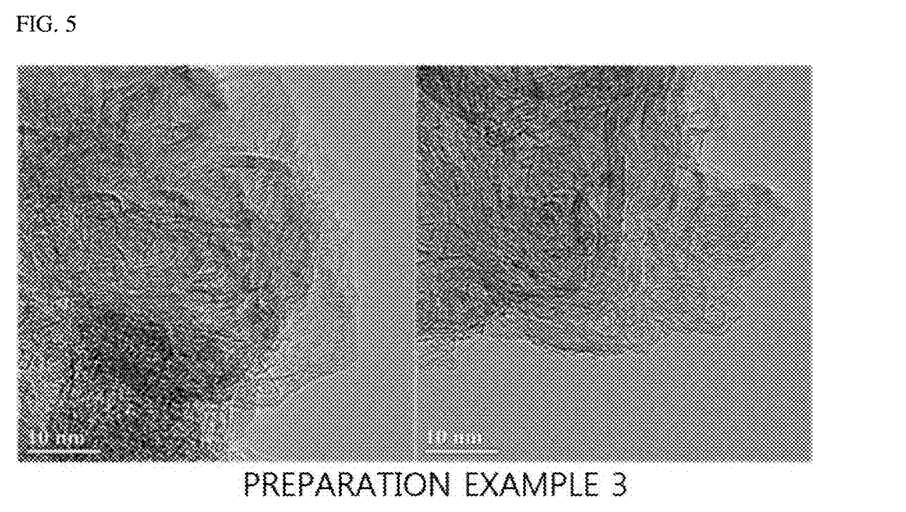
Figure 6:
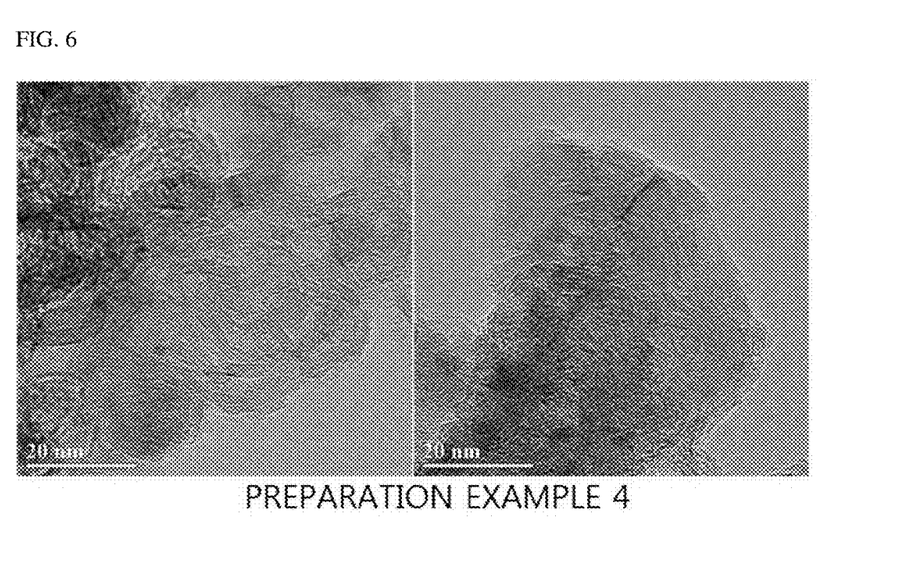
Figure 7:
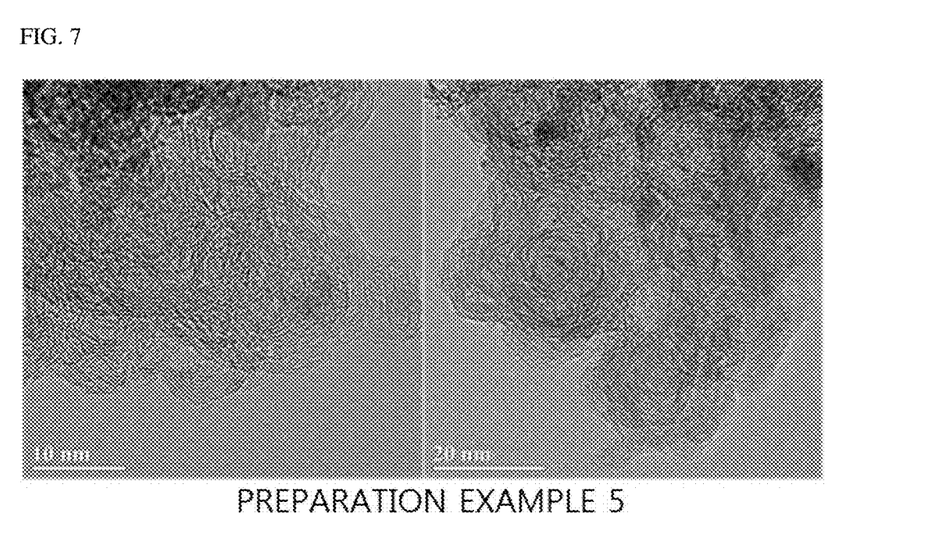
Figure 8:
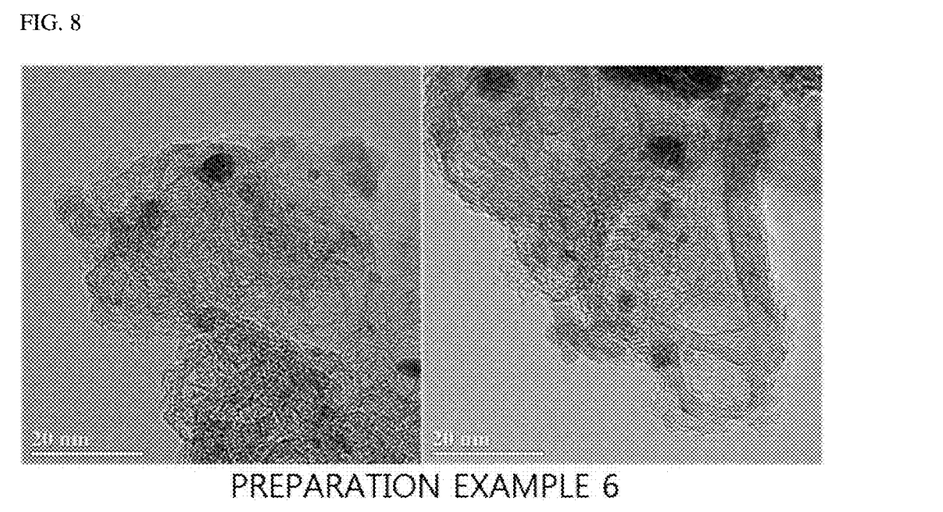

FIG. 2 is a schematic diagram of an energy storage device according to an embodiment of the present invention.

In the embodiment, the energy storage device may be an electrochemical capacitor or a secondary battery as an electrochemical energy storage device. The electrochemical capacitor may be a supercapacitor or a lithium ion capacitor. The secondary battery may be a lithium secondary battery, a sodium secondary battery, or a lithium-air battery. However, the present invention is not limited thereto.

Hereinafter, the lithium-air battery will be described as an example.

Referring to FIG. 2, the lithium-air battery includes a positive electrode active material layer 120, a negative electrode active material layer 140, and a separation film 130 interposed therebetween. An electrolyte 160 may be disposed or loaded between the positive electrode active material layer 120 and the separation film 130, and between the negative electrode active material layer 140 and the separation film 130. The positive electrode active material layer 120 may be disposed on a positive electrode current collector 110, and the negative electrode active material layer 140 may be disposed on a negative electrode current collector 150.

A positive electrode including the positive electrode active material layer 120 and the positive electrode current collector 110 may also be referred to as an air electrode. The positive electrode current collector 110 may use a network- or mesh-type porous structure for rapidly diffusing oxygen. For example, a porous metal plate such as iron, copper, aluminum, nickel, stainless steel, titanium, tantalum, gold or platinum or a carbon paper coated with a carbon paste may be used. However, the present invention is not limited thereto, and any one which can be used as a collector in the conventional art may be used. In addition, the positive electrode current collector 110 may be coated with an antioxidant metal or an alloy film.

The positive electrode active material layer 120 may include a carbon structure formed according to the manufacturing method described with reference to FIG. 1. Particularly, when the carbon structure has a crystalline phase, conductivity may be enhanced, and particularly, when the crystalline phase is linear, conductivity may be remarkably enhanced. Moreover, when multiple pores are included in the carbon structure, the pores can be used as a pathway of oxygen in the lithium-air battery, and thus battery capacity may be remarkably enhanced.

The positive electrode active material layer 120 may further include a redox catalyst of oxygen in addition to the carbon structure. The redox catalyst of oxygen may be a transition metal oxide. As an example, the transition metal oxide may be at least one selected from the group consisting of $SnO_2$, $MnO$, $MnO_2$, $Mn_2O_3$, $RuO_2$, $FeO$, $Fe_2O_3$, $Fe_3O_4$, $NiO$, $Co_3O_4$, and $CuO$. Previously, in the manufacturing method of the carbon structure described with reference to FIG. 1, when distilled water is added to a reaction solution, a carbon structure containing a transition metal oxide may be formed, it may have an advantage that the transition metal oxide is not added to the carbon structure.

The positive electrode active material layer 120 may further include a binder to be easily fixed to the positive electrode current collector 110. The binder may be selected from various materials such as polyvinylalcohol, diacetylcellulose, polyethylene, polypropylene, and an epoxy resin.

The negative electrode active material layer 140 and the negative electrode current collector 150 may constitute a negative electrode, and the negative electrode active material layer 140 may be lithium or a lithium alloy. The lithium alloy may be an alloy of lithium and at least one metal selected from the group consisting of aluminum, tin, magnesium, indium and calcium. The negative electrode current collector 150 may be a thermal resistant metal, for example, iron, copper, aluminum, nickel, stainless steel, titanium, tantalum, gold and titanium.

The separation film 130 may be an insulating porous structure, and may be a film laminate containing polyethylene or polypropylene or a non-woven fabric containing cellulose, polyester, or polypropylene.

The electrolyte 160 may be an aqueous or non-aqueous electrolyte solution, but to increase an operating voltage, a non-aqueous electrolyte solution may be used. However, the present invention is not limited thereto, and the electrolyte 160 may be a solid electrolyte. The non-aqueous electrolyte solution may include an electrolyte and a medium, and the electrolyte may be a lithium salt, a copper salt or an ammonium salt. The lithium salt may be lithium perchlorate ($LiClO_4$), lithium tetrafluoroborate ($LiBF_4$), lithium-hexafluorophosphate ($LiPF_6$), lithium trifluoromethane sulfonate ($LiCF_3SO_3$), lithium hexafluoroarcenate ($LiAsF_6$), or lithium trifluoromethanesulfonyl imide ($Li(CF_3SO_2)_2N$). The copper salt may be copper (I) thiocyanate or copper (II)

triflate. The ammonium salt may be tetraethylammonium tetrafluoroborate (TEABF$_4$), triethylmonomethylammonium tetrafluoroborate, tetraethylammonium hexafluorophosphate, an N,N-diethyl-N-methyl-N-(2-methoxyethyl) ammonium (DEME) salt. The medium may be ethylenecarbonate, propylenecarbonate. dimethylcarbonate, methylethylcarbonate, diethylcarbonate, acrylonitrile, or γ-caprolactone.

Hereinafter, examples will be provided to help in understanding the present invention. However, the following examples are merely provided to help in understanding the present invention, but the present invention is not limited by the following examples.

PREPARATION EXAMPLES 1 TO 9

Manufacture of Carbon Structure

A reaction solution was prepared by mixing ferrocene and/or thiophene as a catalyst at an amount shown in Table 1 with 100 parts by weight (355 g) of benzene as a solvent. Afterward, plasma was generated in the reaction solution. An electrode for generating the plasma was formed of a tungsten rod material having a diameter of 2.6 mm, and a distance between electrodes was maintained at 0.5 mm using a thickness gauge. To generate the plasma, a power supply was discharged at a frequency, a pulse width and a voltage of 30 kHz, 5 μs, and 8250 V, respectively. To uniformly maintain concentration distribution in the reaction solution during the discharging, stirring was performed, and the solution was not cooled. According to the progress of the plasma generating operation, a color of the benzene was drastically changed to black in the reaction solution, and black carbon structures were synthesized.

After the plasma generating operation was completed, the formed carbon structure was filtered and separated, and dried in an oven at 80° C. for 24 hours in an air atmosphere. The dried carbon structure was thermal-treated at 450° C. for 20 minutes.

PREPARATION EXAMPLE 10

Manufacture of Carbon Structure

A carbon structure was manufactured by the same method as described in Preparation Example 1, except that 700 parts by weight (860 g) of distilled water, 10 parts by weight of ferrocene and 10 parts by weight of thiophene were mixed with 100 parts by weight of benzene (123 g).

PREPARATION EXAMPLE 11

Manufacture of Carbon Structure

A carbon structure was manufactured by the same method as described in Preparation Example 1, except that a reaction solution was prepared by mixing 100 parts by weight (123 g) of benzene and 700 parts by weight of distilled water (860 g).

COMPARATIVE EXAMPLE

Formation of Carbon Structure

A carbon structure was manufactured by the same method as described in Preparation Example 1, except that a reaction solution only containing 355 g benzene was prepared.

TABLE 1

| | Benzene (parts by weight, (actual used weight)) | Ferrocene (parts by weight, (actual used weight)) | Thiophene (parts by weight, (actual used weight)) | Distilled Water (parts by weight, (actual used weight)) |
|---|---|---|---|---|
| Preparation Example 1 | 100 (355 g) | 1 (3.55 g) | — | — |
| Preparation Example 2 | | 1 (3.55 g) | 1 (3.55 g) | — |
| Preparation Example 3 | | 2 (7.1 g) | 2 (7.1 g) | — |
| Preparation Example 4 | | 5 (17.75 g) | — | — |
| Preparation Example 5 | | 5 (17.75 g) | 1 (3.55 g) | — |
| Preparation Example 6 | | 5 (17.75 g) | 5 (17.75 g) | — |
| Preparation Example 7 | | 5 (17.75 g) | 10 (35.5 g) | — |
| Preparation Example 8 | | 10 (35.5 g) | 10 (35.5 g) | — |
| Preparation Example 9 | | — | 1 (3.55 g) | — |
| Preparation Example 10 | 100 (123 g) | 10 (12.3 g) | 10 (12.3 g) | 700 (860 g) |
| Preparation Example 11 | | — | — | 700 (860 g) |
| Comparative Example | 355 g | — | — | — |

Figure 12:
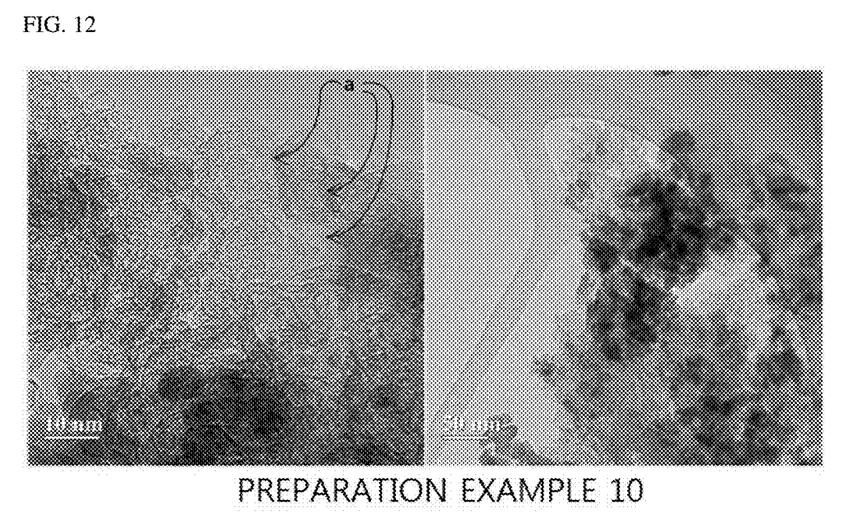
Figure 13:
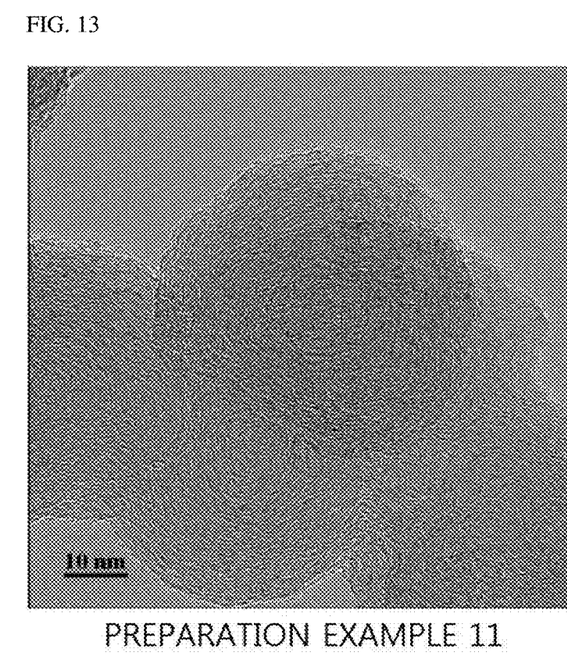
Figure 14:
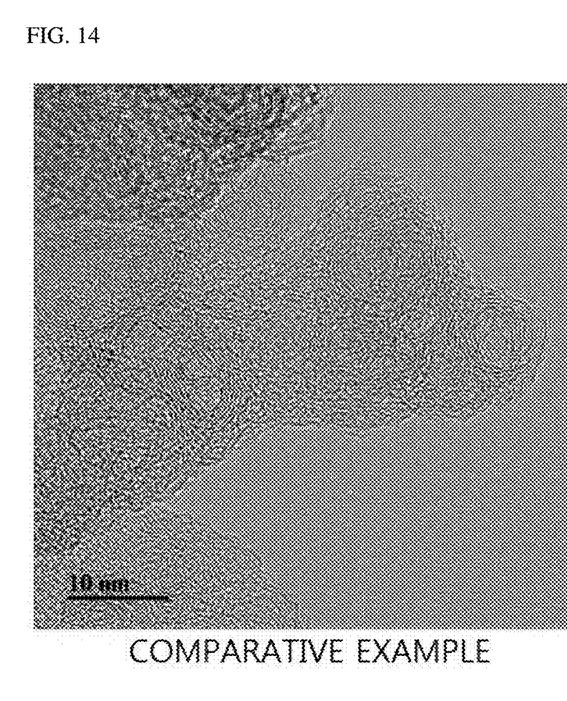
FIG. 14 is a TEM image of a carbon structure according to a Comparative Example.

FIGS. 3 to 13 are TEM images of carbon structures according to Preparation Examples 1 to 11, and FIG. 14 is a TEM image of a carbon structure according to the Comparative Example.

Referring to FIGS. 3 to 12, carbon structures obtained in the Preparation Examples 1-10 show some crystalline phases. On the other hand, referring to FIG. 14, Comparative Example shows only amorphous carbon structures. It is notable that Preparation Examples 1-10 used either or both of ferrocene and thiophene whereas Comparative Example did not use ferrocene or thiophen at all.

Figure 11:
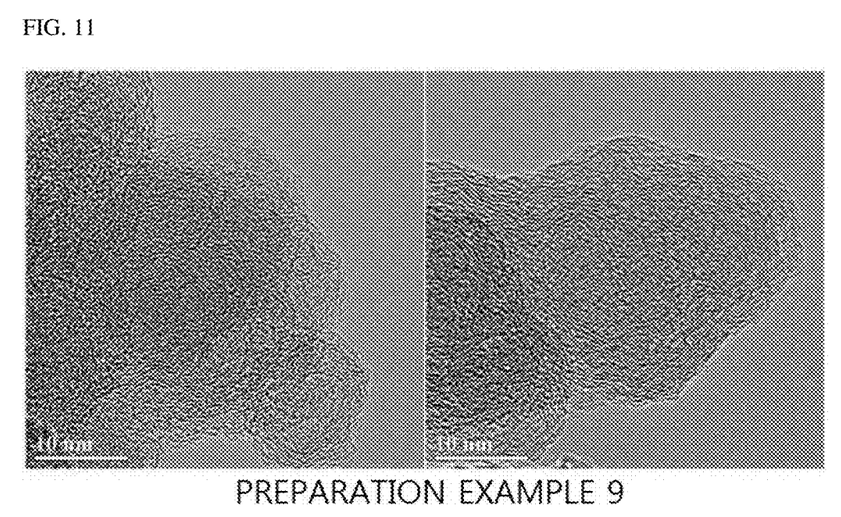

Referring to FIGS. 11 and 13, Preparation Example 11 (FIG. 13) and Preparation Example 9 (FIG. 11) show carbon crystalline phases that are only round or curved at their particular TEM magnification. It is notable that Preparation Example 9 and 11 did not use ferrocene at all and their crystalline phases are only round or curved at the particular magnification.

On the other hand, Preparation Examples 1-8 (FIGS. 3-10) using ferrocene as a catalyst, the carbon structures show some linear crystalline phases at the same TEM magnification as FIGS. 11 and 13 for Preparation Examples 9 and 11. Among these examples using ferocene, particularly Preparation Examples 3-8 (FIGS. 5-10) show linear phase carbon crystalline phases more distinctive and dominant than in Preparation Examples 1-2 (FIGS. 3-4) at the same TEM magnification. It is notable that Preparation Examples 3-8 (distinct linear phases) used a significant amount of ferrocene (over 2 parts by weight) for the reaction compared to Preparation Examples 1 and 2 (less distinct linear phases) where only 1 part by weight of ferrocene was used for the reaction. Linear carbon crystalline phases are preferred for higher electrical and thermal conductivity of the material. More distinct and significant linear crystalline phases are even more preferred.

Figure 9:
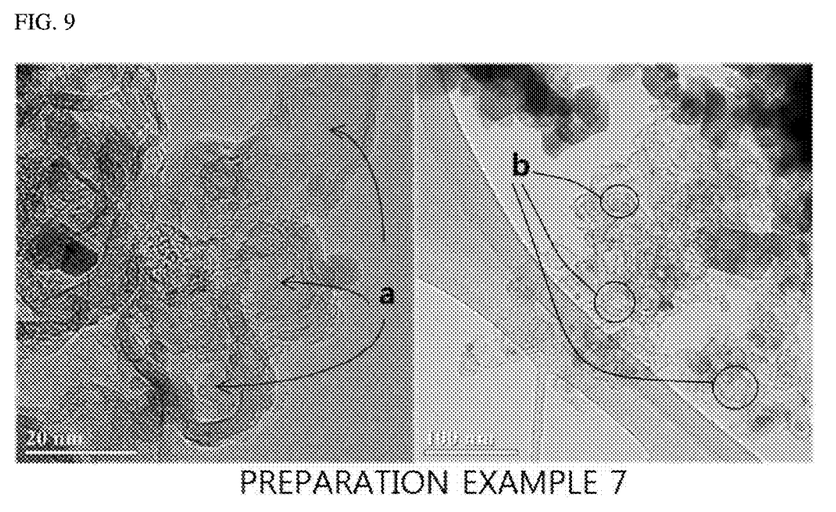
Figure 10:
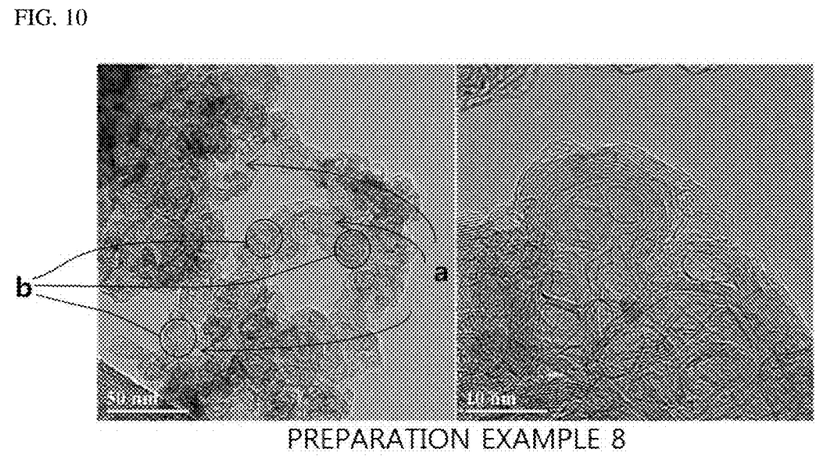

Referring to FIGS. 9, 10 and 12, Preparation Examples 7, 8 and 10 show that mesopores (a in the drawings) were formed in and along with the carbon structures. Mesopores found in these examples have a diameter of 2 to 50 nm. It is notable that the mesopores were formed in Preparation Examples 7, 8 and 10 where ferrocene and a significant amount of thiophene (10 parts by weight) were used in the reaction whereas no such mesopores were found in the other preparation and comparative examples. Further, in Preparation Examples 7 and 8 (FIGS. 9 and 10) formed certain spherical carbone particles (b in the drawings) in addition to the mesopores.

Further, Preparation Example 10 (FIG. 12) shows that iron oxide and sulfur oxide were formed in addition to linear carbon crystalline phases and mesopores. It is understood that these oxides were formed with oxidation of iron from ferrocine and sulfur from thiophene in the presence of distilled water during the plasma operation.

ADDITIONAL PREPARATION EXAMPLES

In addition to Preparation Examples 1-11, more preparation experiments are performed with varying reaction parameters. The preparation experiments of varying reaction parameters are listed in Table 2 below.

For each experiment, the reaction mixture is prepared by mixing metallocene and/or sulfur-containing compound with organic solvent. Plasma is applied to the reaction mixture using the plasma generating system used in Preparation Example 1 or an equivalent system. During the application of plasma discharges, the reaction mixture is stirred and is not subject to cooling. During plasma application, the temperature of the reaction mixture may be at about the boiling point of the solvent. Black carbon structures are formed in the reaction mixture as the plasma application continues. The carbon structures are collected and dried in an oven at 80° C. Then, the dried carbon structures are subjected to a thermal treatment at 450° C. for 20 minutes.

In the carbon structures, linear crystalline phases are observed in TEM pictures. In preparations where a significant amount of metallocene is used, linear crystalline phases are more distinct and dominant. For more distinct and dominant linear phases, the amount of metallocene is about 2 parts by weight or more when the solvent is 100 parts, although not limited thereto. In preparations where a significant amount of sulfur-containing compound is used in addition to metallocene, mesopares in a diameter of 2-50 nm are observed. For the mesopores, the amount of sulfur-containing compound is about 7, about 8, about 9, about 10, about 11 parts by weight or more when the solvent is 100 parts, although not limited thereto.

Further experiments are conducted in which ferrocene in Preparation Examples 12-903 is replaced with each of nickelocene, cobaltocene and ruthenocene. Further experiments are conducted in which thiophene in Preparation Examples 12-903 is replaced with each of dibenzothiophene, diphenyldisulfide, hydrogen sulfide, diallyl sulfide and allyl methyl sulfide. For each Preparation Examples 12-903 and further experiments of using other metallocene and other sulfur-containing compound, additional experiments are conducted with the addition of 500, 600, 700, 800 parts by weight of distilled water to the reaction mixture.

TABLE 2

| Preparation Example No. | Solvent (parts by weight) | Metallocene (parts by weight) | Sulfur-containing Compound (parts by weight) | Distilled Water (parts by weight) |
| --- | --- | --- | --- | --- |
| 12 | Benzene 100 parts | Ferrocene 1.2 parts | — | — |
| 13 | | Ferrocene 1.4 parts | — | — |
| 14 | | Ferrocene 1.6 parts | — | — |
| 15 | | Ferrocene 1.8 parts | — | — |
| 16 | | Ferrocene 1.9 parts | — | — |
| 17 | | Ferrocene 2 parts | — | — |
| 18 | | Ferrocene 2.1 parts | — | — |
| 19 | | Ferrocene 2.3 parts | — | — |
| 20 | | Ferrocene 2.5 parts | — | — |
| 21 | | Ferrocene 1.6 parts | Thiophene 1 part | — |
| 22 | | Ferrocene 1.8 parts | Thiophene 1 part | — |
| 23 | | Ferrocene 1.9 parts | Thiophene 1 part | — |
| 24 | | Ferrocene 2 parts | Thiophene 1 part | — |
| 25 | | Ferrocene 2.1 parts | Thiophene 1 part | — |
| 26 | | Ferrocene 2.3 parts | Thiophene 1 part | — |
| 27 | | Ferrocene 2.5 parts | Thiophene 1 part | — |
| 28 | | Ferrocene 1.6 parts | Thiophene 2 parts | — |
| 29 | | Ferrocene 1.8 parts | Thiophene 2 parts | — |
| 30 | | Ferrocene 1.9 parts | Thiophene 2 parts | — |
| 31 | | Ferrocene 2 parts | Thiophene 2 parts | — |
| 32 | | Ferrocene 2.1 parts | Thiophene 2 parts | — |
| 33 | | Ferrocene 2.3 parts | Thiophene 2 parts | — |
| 34 | | Ferrocene 2.5 parts | Thiophene 2 parts | — |
| 35 | | Ferrocene 2.7 parts | Thiophene 2 parts | — |
| 36 | | Ferrocene 3 parts | Thiophene 2 parts | — |
| 37 | | Ferrocene 4 parts | Thiophene 2 parts | — |
| 38 | | Ferrocene 4.3 parts | Thiophene 2 parts | — |
| 39 | | Ferrocene 4.6 parts | Thiophene 2 parts | — |
| 40 | | Ferrocene 4.8 parts | Thiophene 2 parts | — |
| 41 | | Ferrocene 4.9 parts | Thiophene 2 parts | — |
| 42 | | Ferrocene 5 parts | Thiophene 2 parts | — |
| 43 | | Ferrocene 5.1 parts | Thiophene 2 parts | — |
| 44 | | Ferrocene 5.3 parts | Thiophene 2 parts | — |
| 45 | | Ferrocene 5.5 parts | Thiophene 2 parts | — |
| 46 | | Ferrocene 5.7 parts | Thiophene 2 parts | — |
| 47 | | Ferrocene 6 parts | Thiophene 2 parts | — |
| 48 | | Ferrocene 4 parts | Thiophene 3 parts | — |
| 49 | | Ferrocene 4.3 parts | Thiophene 3 parts | — |

TABLE 2-continued

| Preparation Example No. | Solvent (parts by weight) | Metallocene (parts by weight) | Sulfur-containing Compound (parts by weight) | Distilled Water (parts by weight) |
|---|---|---|---|---|
| 50 | | Ferrocene 4.6 parts | Thiophene 3 parts | — |
| 51 | | Ferrocene 4.8 parts | Thiophene 3 parts | — |
| 52 | | Ferrocene 4.9 parts | Thiophene 3 parts | — |
| 53 | | Ferrocene 5 parts | Thiophene 3 parts | — |
| 54 | | Ferrocene 5.1 parts | Thiophene 3 parts | — |
| 55 | | Ferrocene 5.3 parts | Thiophene 3 parts | — |
| 56 | | Ferrocene 5.5 parts | Thiophene 3 parts | — |
| 57 | | Ferrocene 5.7 parts | Thiophene 3 parts | — |
| 58 | | Ferrocene 6 parts | Thiophene 3 parts | — |
| 59 | | Ferrocene 4 parts | Thiophene 4 parts | — |
| 60 | | Ferrocene 4.3 parts | Thiophene 4 parts | — |
| 61 | | Ferrocene 4.6 parts | Thiophene 4 parts | — |
| 62 | | Ferrocene 4.8 parts | Thiophene 4 parts | — |
| 63 | | Ferrocene 4.9 parts | Thiophene 4 parts | — |
| 64 | | Ferrocene 5 parts | Thiophene 4 parts | — |
| 65 | | Ferrocene 5.1 parts | Thiophene 4 parts | — |
| 66 | | Ferrocene 5.3 parts | Thiophene 4 parts | — |
| 67 | | Ferrocene 5.5 parts | Thiophene 4 parts | — |
| 68 | | Ferrocene 5.7 parts | Thiophene 4 parts | — |
| 69 | | Ferrocene 6 parts | Thiophene 4 parts | — |
| 70 | | Ferrocene 4 parts | Thiophene 5 parts | — |
| 71 | | Ferrocene 4.3 parts | Thiophene 5 parts | — |
| 72 | | Ferrocene 4.6 parts | Thiophene 5 parts | — |
| 73 | | Ferrocene 4.8 parts | Thiophene 5 parts | — |
| 74 | | Ferrocene 4.9 parts | Thiophene 5 parts | — |
| 75 | | Ferrocene 5 parts | Thiophene 5 parts | — |
| 76 | | Ferrocene 5.1 parts | Thiophene 5 parts | — |
| 77 | | Ferrocene 5.3 parts | Thiophene 5 parts | — |
| 78 | | Ferrocene 5.5 parts | Thiophene 5 parts | — |
| 79 | | Ferrocene 5.7 parts | Thiophene 5 parts | — |
| 80 | | Ferrocene 6 parts | Thiophene 5 parts | — |
| 81 | | Ferrocene 2 parts | Thiophene 7 parts | — |
| 82 | | Ferrocene 3 parts | Thiophene 7 parts | — |
| 83 | | Ferrocene 4 parts | Thiophene 7 parts | — |
| 84 | | Ferrocene 4.3 parts | Thiophene 7 parts | — |
| 85 | | Ferrocene 4.6 parts | Thiophene 7 parts | — |
| 86 | | Ferrocene 4.8 parts | Thiophene 7 parts | — |
| 87 | | Ferrocene 4.9 parts | Thiophene 7 parts | — |
| 88 | | Ferrocene 5 parts | Thiophene 7 parts | — |
| 89 | | Ferrocene 5.1 parts | Thiophene 7 parts | — |
| 90 | | Ferrocene 5.3 parts | Thiophene 7 parts | — |
| 91 | | Ferrocene 5.5 parts | Thiophene 7 parts | — |
| 92 | | Ferrocene 5.7 parts | Thiophene 7 parts | — |
| 93 | | Ferrocene 6 parts | Thiophene 7 parts | — |
| 94 | | Ferrocene 7 parts | Thiophene 7 parts | — |
| 95 | | Ferrocene 8 parts | Thiophene 7 parts | — |
| 96 | | Ferrocene 9 parts | Thiophene 7 parts | — |
| 97 | | Ferrocene 9.5 parts | Thiophene 7 parts | — |
| 98 | | Ferrocene 10 parts | Thiophene 7 parts | — |
| 99 | | Ferrocene 10.5 parts | Thiophene 7 parts | — |
| 100 | | Ferrocene 11 parts | Thiophene 7 parts | — |
| 101 | | Ferrocene 12 parts | Thiophene 7 parts | — |
| 102 | | Ferrocene 13 parts | Thiophene 7 parts | — |
| 103 | | Ferrocene 2 parts | Thiophene 9 parts | — |
| 104 | | Ferrocene 3 parts | Thiophene 9 parts | — |
| 105 | | Ferrocene 4 parts | Thiophene 9 parts | — |
| 106 | | Ferrocene 4.3 parts | Thiophene 9 parts | — |
| 107 | | Ferrocene 4.6 parts | Thiophene 9 parts | — |
| 108 | | Ferrocene 4.8 parts | Thiophene 9 parts | — |
| 109 | | Ferrocene 4.9 parts | Thiophene 9 parts | — |
| 110 | | Ferrocene 5 parts | Thiophene 9 parts | — |
| 111 | | Ferrocene 5.1 parts | Thiophene 9 parts | — |
| 112 | | Ferrocene 5.3 parts | Thiophene 9 parts | — |
| 113 | | Ferrocene 5.5 parts | Thiophene 9 parts | — |
| 114 | | Ferrocene 5.7 parts | Thiophene 9 parts | — |
| 115 | | Ferrocene 6 parts | Thiophene 9 parts | — |
| 116 | | Ferrocene 7 parts | Thiophene 9 parts | — |
| 117 | | Ferrocene 8 parts | Thiophene 9 parts | — |
| 118 | | Ferrocene 9 parts | Thiophene 9 parts | — |
| 119 | | Ferrocene 9.5 parts | Thiophene 9 parts | — |
| 120 | | Ferrocene 10 parts | Thiophene 9 parts | — |
| 121 | | Ferrocene 10.5 parts | Thiophene 9 parts | — |
| 122 | | Ferrocene 11 parts | Thiophene 9 parts | — |
| 123 | | Ferrocene 12 parts | Thiophene 9 parts | — |
| 124 | | Ferrocene 13 parts | Thiophene 9 parts | — |
| 125 | | Ferrocene 2 parts | Thiophene 9.5 parts | — |

TABLE 2-continued

| Preparation Example No. | Solvent (parts by weight) | Metallocene (parts by weight) | Sulfur-containing Compound (parts by weight) | Distilled Water (parts by weight) |
|---|---|---|---|---|
| 126 | | Ferrocene 3 parts | Thiophene 9.5 parts | — |
| 127 | | Ferrocene 4 parts | Thiophene 9.5 parts | — |
| 128 | | Ferrocene 4.3 parts | Thiophene 9.5 parts | — |
| 129 | | Ferrocene 4.6 parts | Thiophene 9.5 parts | — |
| 130 | | Ferrocene 4.8 parts | Thiophene 9.5 parts | — |
| 131 | | Ferrocene 4.9 parts | Thiophene 9.5 parts | — |
| 132 | | Ferrocene 5 parts | Thiophene 9.5 parts | — |
| 133 | | Ferrocene 5.1 parts | Thiophene 9.5 parts | — |
| 134 | | Ferrocene 5.3 parts | Thiophene 9.5 parts | — |
| 135 | | Ferrocene 5.5 parts | Thiophene 9.5 parts | — |
| 136 | | Ferrocene 5.7 parts | Thiophene 9.5 parts | — |
| 137 | | Ferrocene 6 parts | Thiophene 9.5 parts | — |
| 138 | | Ferrocene 7 parts | Thiophene 9.5 parts | — |
| 139 | | Ferrocene 8 parts | Thiophene 9.5 parts | — |
| 140 | | Ferrocene 9 parts | Thiophene 9.5 parts | — |
| 141 | | Ferrocene 9.5 parts | Thiophene 9.5 parts | — |
| 142 | | Ferrocene 10 parts | Thiophene 9.5 parts | — |
| 143 | | Ferrocene 10.5 parts | Thiophene 9.5 parts | — |
| 144 | | Ferrocene 11 parts | Thiophene 9.5 parts | — |
| 145 | | Ferrocene 12 parts | Thiophene 9.5 parts | — |
| 146 | | Ferrocene 13 parts | Thiophene 9.5 parts | — |
| 147 | | Ferrocene 2 parts | Thiophene 10 parts | — |
| 148 | | Ferrocene 3 parts | Thiophene 10 parts | — |
| 149 | | Ferrocene 4 parts | Thiophene 10 parts | — |
| 150 | | Ferrocene 4.3 parts | Thiophene 10 parts | — |
| 151 | | Ferrocene 4.6 parts | Thiophene 10 parts | — |
| 152 | | Ferrocene 4.8 parts | Thiophene 10 parts | — |
| 153 | | Ferrocene 4.9 parts | Thiophene 10 parts | — |
| 154 | | Ferrocene 5 parts | Thiophene 10 parts | — |
| 155 | | Ferrocene 5.1 parts | Thiophene 10 parts | — |
| 156 | | Ferrocene 5.3 parts | Thiophene 10 parts | — |
| 157 | | Ferrocene 5.5 parts | Thiophene 10 parts | — |
| 158 | | Ferrocene 5.7 parts | Thiophene 10 parts | — |
| 159 | | Ferrocene 6 parts | Thiophene 10 parts | — |
| 160 | | Ferrocene 7 parts | Thiophene 10 parts | — |
| 161 | | Ferrocene 8 parts | Thiophene 10 parts | — |
| 162 | | Ferrocene 9 parts | Thiophene 10 parts | — |
| 163 | | Ferrocene 9.5 parts | Thiophene 10 parts | — |
| 164 | | Ferrocene 10 parts | Thiophene 10 parts | — |
| 165 | | Ferrocene 10.5 parts | Thiophene 10 parts | — |
| 166 | | Ferrocene 11 parts | Thiophene 10 parts | — |
| 167 | | Ferrocene 12 parts | Thiophene 10 parts | — |
| 168 | | Ferrocene 13 parts | Thiophene 10 parts | — |
| 169 | | Ferrocene 2 parts | Thiophene 10.5 parts | — |
| 170 | | Ferrocene 3 parts | Thiophene 10.5 parts | — |
| 171 | | Ferrocene 4 parts | Thiophene 10.5 parts | — |
| 172 | | Ferrocene 4.3 parts | Thiophene 10.5 parts | — |
| 173 | | Ferrocene 4.6 parts | Thiophene 10.5 parts | — |
| 174 | | Ferrocene 4.8 parts | Thiophene 10.5 parts | — |
| 175 | | Ferrocene 4.9 parts | Thiophene 10.5 parts | — |
| 176 | | Ferrocene 5 parts | Thiophene 10.5 parts | — |
| 177 | | Ferrocene 5.1 parts | Thiophend 10.5 parts | — |
| 178 | | Ferrocene 5.3 parts | Thiophene 10.5 parts | — |
| 179 | | Ferrocene 5.5 parts | Thiophene 10.5 parts | — |
| 180 | | Ferrocene 5.7 parts | Thiophene 10.5 parts | — |
| 181 | | Ferrocene 6 parts | Thiophene 10.5 parts | — |
| 182 | | Ferrocene 7 parts | Thiophene 10.5 parts | — |
| 183 | | Ferrocene 8 parts | Thiophene 10.5 parts | — |
| 184 | | Ferrocene 9 parts | Thiophene 10.5 parts | — |
| 185 | | Ferrocene 9.5 parts | Thiophene 10.5 parts | — |
| 186 | | Ferrocene 10 parts | Thiophene 10.5 parts | — |
| 187 | | Ferrocene 10.5 parts | Thiophene 10.5 parts | — |
| 188 | | Ferrocene 11 parts | Thiophene 10.5 parts | — |
| 189 | | Ferrocene 12 parts | Thiophene 10.5 parts | — |
| 190 | | Ferrocene 13 parts | Thiophene 10.5 parts | — |
| 191 | | Ferrocene 2 parts | Thiophene 11 parts | — |
| 192 | | Ferrocene 3 parts | Thiophene 11 parts | — |
| 193 | | Ferrocene 4 parts | Thiophene 11 parts | — |
| 194 | | Ferrocene 4.3 parts | Thiophene 11 parts | — |
| 195 | | Ferrocene 4.6 parts | Thiophene 11 parts | — |
| 196 | | Ferrocene 4.8 parts | Thiophene 11 parts | — |
| 197 | | Ferrocene 4.9 parts | Thiophene 11 parts | — |
| 198 | | Ferrocene 5 parts | Thiophene 11 parts | — |
| 199 | | Ferrocene 5.1 parts | Thiophene 11 parts | — |
| 200 | | Ferrocene 5.3 parts | Thiophene 11 parts | — |
| 201 | | Ferrocene 5.5 parts | Thiophene 11 parts | |

TABLE 2-continued

| Preparation Example No. | Solvent (parts by weight) | Metallocene (parts by weight) | Sulfur-containing Compound (parts by weight) | Distilled Water (parts by weight) |
|---|---|---|---|---|
| 202 | | Ferrocene 5.7 parts | Thiophene 11 parts | — |
| 203 | | Ferrocene 6 parts | Thiophene 11 parts | — |
| 204 | | Ferrocene 7 parts | Thiophene 11 parts | — |
| 205 | | Ferrocene 8 parts | Thiophene 11 parts | — |
| 206 | | Ferrocene 9 parts | Thiophene 11 parts | — |
| 207 | | Ferrocene 9.5 parts | Thiophene 11 parts | — |
| 208 | | Ferrocene 10 parts | Thiophene 11 parts | — |
| 209 | | Ferrocene 10.5 parts | Thiophene 11 parts | — |
| 210 | | Ferrocene 11 parts | Thiophene 11 parts | — |
| 211 | | Ferrocene 12 parts | Thiophene 11 parts | — |
| 212 | | Ferrocene 13 parts | Thiophene 11 parts | — |
| 213 | | Ferrocene 2 parts | Thiophene 12 parts | — |
| 214 | | Ferrocene 3 parts | Thiophene 12 parts | — |
| 215 | | Ferrocene 4 parts | Thiophene 12 parts | — |
| 216 | | Ferrocene 4.3 parts | Thiophene 12 parts | — |
| 217 | | Ferrocene 4.6 parts | Thiophene 12 parts | — |
| 218 | | Ferrocene 4.8 parts | Thiophene 12 parts | — |
| 219 | | Ferrocene 4.9 parts | Thiophene 12 parts | — |
| 220 | | Ferrocene 5 parts | Thiophene 12 parts | — |
| 221 | | Ferrocene 5.1 parts | Thiophene 12 parts | — |
| 222 | | Ferrocene 5.3 parts | Thiophene 12 parts | — |
| 223 | | Ferrocene 5.5 parts | Thiophene 12 parts | — |
| 224 | | Ferrocene 5.7 parts | Thiophene 12 parts | — |
| 225 | | Ferrocene 6 parts | Thiophene 12 parts | — |
| 226 | | Ferrocene 7 parts | Thiophene 12 parts | — |
| 227 | | Ferrocene 8 parts | Thiophene 12 parts | — |
| 228 | | Ferrocene 9 parts | Thiophene 12 parts | — |
| 229 | | Ferrocene 9.5 parts | Thiophene 12 parts | — |
| 230 | | Ferrocene 10 parts | Thiophene 12 parts | — |
| 231 | | Ferrocene 10.5 parts | Thiophene 12 parts | — |
| 232 | | Ferrocene 11 parts | Thiophene 12 parts | — |
| 233 | | Ferrocene 12 parts | Thiophene 12 parts | — |
| 234 | | Ferrocene 13 parts | Thiophene 12 parts | — |
| 235-457 | biphenyl 100 parts | Ferrocene as in Preparation Example No. 12-234, in which, for instance, Preparation Example 235 corresponds to Preparation Example 12 and Preparation Example 457 corresponds to Preparation Example 234. | Thiophene as in Example No. 12-234, in which, for instance, Preparation Example 235 corresponds to Preparation Example 12 and Preparation Example 457 corresponds to Preparation Example 234. | — |
| 458-680 | naphthalene 100 parts | Ferrocene as in Preparation Example No. 12-234, in which, for instance, Preparation Example 235 corresponds to Preparation Example 12 and Preparation Example 457 corresponds to Preparation Example 234. | Thiophene as in Example No. 12-234, in which, for instance, Preparation Example 235 corresponds to Preparation Example 12 and Preparation Example 457 corresponds to Preparation Example 234. | — |
| 681-903 | anthracene 100 parts | Ferrocene as in Preparation Example No. 12-234, in which, for instance, Preparation Example 235 corresponds to Preparation Example 12 and Preparation Example 457 corresponds to Preparation Example 234. | Thiophene as in Example No. 12-234, in which, for instance, an Preparation Example 235 corresponds to Preparation Example 12 and Preparation Example 457 corresponds to Preparation Example 234. | — |

While the invention has been shown and described with reference to certain embodiments thereof, it will be understood by those skilled in the art that various changes in form and details may be made therein without departing from the scope of the invention as defined by the appended claims.

What is claimed is:
1. A method of preparing carbon nanoparticles, comprising:
mixing a metallocene compound and an aromatic compound to provide a liquid mixture, wherein the aromatic compound is at least one selected from the group consisting of benzene, biphenyl, naphthalene and anthracene;
applying plasma discharges to the liquid mixture while the liquid mixture is at or about a temperature of a boiling point of the aromatic compound, which causes chemical reactions in the liquid mixture to produce carbon nanoparticles having linear crystalline phases; and
collecting the carbon nanoparticles having linear crystalline phases.

2. The method according to claim 1, wherein applying plasma discharges is performed while at least one electrode is immersed in the liquid mixture.

3. The method according to claim 1, wherein the liquid mixture further comprises at least one sulfur-containing compound.

4. The method according to claim 3, wherein the metallocene compound comprises ferrocene, and the sulfur-containing compound comprises thiophene.

5. The method according to claim 1, wherein the metallocene compound is at least one selected from the group consisting of ferrocene, nickelocene, cobaltocene, and ruthenocene.

6. The method according to claim 1, wherein the metallocene compound is contained in the liquid mixture at 1 to 10 parts by weight with respect to 100 parts by weight of the aromatic compound.

7. The method according to claim 1, wherein the metallocene compound is contained in the liquid mixture at 2 to 10 parts by weight with respect to 100 parts by weight of the aromatic compound.

8. The method according to claim 1, wherein the metallocene compound is contained in the liquid mixture at 5 to 10 parts by weight with respect to 100 parts by weight of the aromatic compound.

9. The method according to claim 3, wherein the sulfur-containing compound is at least one selected from the group consisting of thiophene, dibenzothiophene, diphenyldisulfide, hydrogen sulfide, diallyl sulfide, and allyl methyl sulfide.

10. The method according to claim 9, wherein the sulfur-containing compound is contained in the liquid mixture at 1 to 10 parts by weight with respect to 100 parts by weight of the aromatic compound.

11. The method according to claim 1, wherein the liquid mixture further includes distilled water.

12. The method according to claim 1, wherein the aromatic compound comprises benzene and the liquid mixture is maintained at or about the boiling point of benzene when applying the plasma discharges.

13. A method of preparing carbon nanoparticles, comprising:

mixing a metallocene compound and an aromatic compound to provide a liquid mixture, wherein the aromatic compound is at least one selected from the group consisting of benzene, biphenyl, naphthalene and anthracene;

immersing at least one electrode in the liquid mixture; and generating plasma discharge in the liquid mixture via the at least one electrode immersed therein, which causes chemical reactions in the liquid mixture to produce carbon nanoparticles having linear crystalline phases; and collecting the carbon nanoparticles having linear crystalline phases.

14. The method according to claim 13, wherein plasma discharges are generated in the liquid mixture at or about a temperature of a boiling point of the aromatic compound.

15. The method according to claim 13, wherein the liquid mixture further comprises at least one sulfur-containing compound selected from the group consisting of thiophene, dibenzothiophene, diphenyldisulfide, hydrogen sulfide, diallyl sulfide, and allyl methyl sulfide.

16. The method according to claim 15, wherein the metallocene compound comprises ferrocene, and the sulfur-containing compound comprises thiophene.

17. The method according to claim 15, wherein the aromatic compound comprises benzene, the metallocene compound comprises ferrocene, and the sulfur-containing compound comprises thiophene.

18. The method according to claim 15, wherein the sulfur-containing compound is contained in the liquid mixture at 1 to 10 parts by weight with respect to 100 parts by weight of the aromatic compound.

19. The method according to claim 13, wherein the metallocene compound is at least one selected from the group consisting of ferrocene, nickelocene, cobaltocene, and ruthenocene.

20. The method according to claim 13, wherein the metallocene compound is contained in the liquid mixture at 1 to 10 parts by weight with respect to 100 parts by weight of the aromatic compound.

* * * * *